(12) United States Patent
Ahmadi

(10) Patent No.: US 9,788,313 B2
(45) Date of Patent: *Oct. 10, 2017

(54) USER EQUIPMENT FOR RECEIVING COORDINATED MULTI-POINT (COMP) TRANSMISSIONS

(71) Applicant: Intel Corporation, Santa Clara, CA (US)

(72) Inventor: Sassan Ahmadi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,450

(22) Filed: Oct. 13, 2015

(65) Prior Publication Data

US 2016/0037497 A1 Feb. 4, 2016

Related U.S. Application Data

(63) Continuation of application No. 14/077,556, filed on Nov. 12, 2013, now Pat. No. 9,203,577, which is a (Continued)

(51) Int. Cl.
*H04W 72/04* (2009.01)
*H04L 12/54* (2013.01)
(Continued)

(52) U.S. Cl.
CPC ......... *H04W 72/042* (2013.01); *H04L 5/0035* (2013.01); *H04L 12/5692* (2013.01);
(Continued)

(58) Field of Classification Search
CPC ... H04L 12/5692; H04L 43/026; H04L 45/24; H04L 5/0035; H04W 12/10;
(Continued)

(56) References Cited

U.S. PATENT DOCUMENTS 5,239,668 A 8/1993 Davis
5,677,681 A 10/1997 Tanaka et al.
(Continued)

FOREIGN PATENT DOCUMENTS

CN 1856124 A 11/2006
CN 1977551 A 6/2007
(Continued)

OTHER PUBLICATIONS

"U.S. Appl. No. 12/976,287, Notice of Allowance dated Aug. 2, 2013", 17 pgs.
(Continued)

*Primary Examiner* — Asad Nawaz
*Assistant Examiner* — Saad A Waqas
(74) *Attorney, Agent, or Firm* — Schwegman Lundberg & Woessner, P.A.

(57) ABSTRACT

Embodiments of an enhanced base station and method for communicating through an enhanced distributed antenna system (eDAS) are generally described herein. The eDAS includes geographically-separated antenna nodes and each of the antenna nodes has a plurality of antenna elements. The base station may perform physical-layer baseband processing for each of the antenna nodes at a centralized processing location, and may cause the antenna nodes to transmit reference signals in accordance with a multiplexing scheme to allow user equipment to perform channel estimation for the antenna elements of any one or more of the antenna nodes. The base station may also cause the antenna nodes to transmit signals having synchronization codes to allow the user equipment to synchronize with the antenna elements of any one or more of the antenna nodes. In some embodiments, the base station may communicate with the antenna nodes over a physical-layer interface.

26 Claims, 8 Drawing Sheets

Related U.S. Application Data continuation of application No. 12/976,287, filed on Dec. 22, 2010, now Pat. No. 8,599,794.

(60) Provisional application No. 61/381,005, filed on Sep. 8, 2010.

(51) Int. Cl.

| | | |
|---|---|---|
| *H04L 12/707* | (2013.01) | |
| *H04W 12/10* | (2009.01) | |
| *H04L 5/00* | (2006.01) | |
| *H04W 28/08* | (2009.01) | |
| *H04W 56/00* | (2009.01) | |
| *H04L 12/26* | (2006.01) | |
| *H04W 76/02* | (2009.01) | |
| *H04W 88/08* | (2009.01) | |
| *H04L 12/851* | (2013.01) | |
| *H04W 12/02* | (2009.01) | |

(52) U.S. Cl.
CPC ............. *H04L 45/24* (2013.01); *H04W 12/10* (2013.01); *H04W 28/08* (2013.01); *H04W 56/001* (2013.01); *H04W 72/0406* (2013.01); *H04L 43/026* (2013.01); *H04L 47/24* (2013.01); *H04W 12/02* (2013.01); *H04W 76/025* (2013.01); *H04W 88/08* (2013.01)

(58) Field of Classification Search
CPC ............... H04W 28/08; H04W 56/001; H04W 72/0406; H04W 72/042; H04W 76/025; H04W 88/08
USPC .................................................. 370/329, 331
See application file for complete search history.

(56) References Cited

U.S. PATENT DOCUMENTS

| | | | |
|---|---|---|---|
| 5,870,426 | A | 2/1999 | Yokev et al. |
| 6,347,234 | B1 | 2/2002 | Scherzer |
| 7,068,977 | B1 | 6/2006 | Yang et al. |
| 8,059,732 | B2 | 11/2011 | Papadopoulos et al. |
| 8,599,794 | B2 | 12/2013 | Ahmadi |
| 8,693,442 | B2 | 4/2014 | Baligh et al. |
| 9,203,577 | B2 | 12/2015 | Ahmadi |
| 2006/0182191 | A1 | 8/2006 | Darwood et al. |
| 2007/0253465 | A1 | 11/2007 | Muharemovic et al. |
| 2008/0117961 | A1 | 5/2008 | Han et al. |
| 2010/0048232 | A1 | 2/2010 | Hwang et al. |
| 2010/0098012 | A1 | 4/2010 | Bala et al. |
| 2010/0177759 | A1 | 7/2010 | Fischer et al. |
| 2010/0238854 | A1 | 9/2010 | Kazmi et al. |
| 2011/0183669 | A1 | 7/2011 | Kazmi |
| 2011/0244877 | A1* | 10/2011 | Farajidana ............ H04L 5/0023 455/452.2 |
| 2011/0269449 | A1* | 11/2011 | Kazmi ................... H04B 7/024 455/422.1 |
| 2012/0020422 | A1 | 1/2012 | Dotzler et al. |
| 2012/0033624 | A1 | 2/2012 | Luo et al. |
| 2012/0057566 | A1 | 3/2012 | Ahmadi |
| 2012/0287875 | A1 | 11/2012 | Kim et al. |
| 2012/0329498 | A1* | 12/2012 | Koo ........................ H04J 11/005 455/501 |
| 2014/0056270 | A1 | 2/2014 | Ahmadi |

FOREIGN PATENT DOCUMENTS

| | | |
|---|---|---|
| CN | 101351035 A | 1/2009 |
| CN | 101388701 A | 3/2009 |
| CN | 103190085 B | 11/2015 |
| CN | 105306134 A | 2/2016 |
| EP | 2214341 A2 | 8/2010 |
| EP | 2614600 B1 | 3/2016 |
| TW | I538426 B | 6/2016 |
| TW | 201626743 A | 7/2016 |
| WO | WO-2009023860 A1 | 2/2009 |
| WO | WO-2009044318 A2 | 4/2009 |
| WO | WO-2010077192 A1 | 7/2010 |
| WO | WO-2012033659 | 3/2012 |

OTHER PUBLICATIONS

"U.S. Appl. No. 14/077,556, Notice of Allowance dated Jul. 6, 2015", 18 pgs.

"U.S. Appl. No. 14/077,556, Preliminary Amendment dated Nov. 13, 2013", 7 pgs.

"Chinese Application Serial No. 201180053799.5, Office Action mailed Feb. 4, 2015", W/ English Translation, 8 pgs.

"European Application Serial No. 11823961.5, Extended European Search Report dated Mar. 5, 2014", 5 pgs.

"European Application Serial No. 11823961.5, Office Action dated Mar. 21, 2014", 1 pg.

"European Application Serial No. 11823961.5, Response filed May 8, 2014 to Office Action dated Mar. 21, 2014", 1 pg.

"IEEE 802.16m System Description Document [Draft]", IEEE 802.16:, [Online]. Retrieved from the Internet: <htpp://www.ieee.org/16>, (Feb. 7, 2009), 1-170.

"International Application Serial No. PCT/US2011/049496, International Preliminary Report on Patentability dated Mar. 12, 2013", 8 pgs "International Application Serial No. PCT/US2011/049496, International Search Report dated Feb. 17, 2012", 3 pgs.

"International Application Serial No. PCT/US2011/049496, Written Opinion dated Feb. 17, 2012", 6 pgs.

"LTE; Evolved Universal Terrestrial Radio Access (E-UTRA); Physical channels and modulation (3GPP TS 36.211 version 9.1.0 Release 9)", Technical Specification, European Telecommunications Standards Institute (ETSI), 650, Route des Lucioles; F-06921SOPHIA-ANTIPOLIS ; France, vol. 3GPP RAN 1, No. V9.1.0,, (Apr. 1, 2010), 87 pgs.

"Taiwanese Application Serial No. 10-129545, Office Action dated Jul. 28, 2014", W/ English Translation, 15 pgs.

"Taiwanese Application Serial No. 103139768, Office Action dated Sep. 17, 2015", 10 pgs.

Gong, P., et al., "Radio resource allocation for multiuser OFDMA distributed antenna systems", IEEE International Conference on Network Infrastructure and Digital Content, 2009. IC-NIDC 2009., Section 2; Figure 1, (2009), 912-916.

Motohiro, Tanno, et al., "Evolved UTRA—physical layer overview", Signal Processing Advances in Wireless Communications, 2007—SPAWC 2007—IEEE 8th Workshop on, IEEE, XX, (Jun. 1, 2007), 1-8.

"Chinese Application Serial No. 201510667392.1, Voluntary Amendment dated Jun. 2, 2016", W/ English Translation of Claims, 16 pgs.

"European Application Serial No. 16155101.5, Extended European Search Report dated May 18, 2016", 10 pgs.

"Taiwanese Application Serial No. 103139768, Response filed Dec. 17, 2015 to Office Action dated Sep. 17, 2015", W/ English Claims, 14 pgs.

Amitava, Ghosh, et al., "LTE-advanced: next-generation wireless broadband technology[Invited Paper]", IEEE Wireless Communications, IEEE Service Center, Piscataway, NJ, US, vol. 17, No. 3, XP011311803, ISSN: 1536-1284, (Jun. 1, 2010), 10-22.

Mats, Bengtsson, et al., "D1.4 Initial Report on Advanced Multiple Antenna Systems", Celtic Telecommunication Solutions, vol. Version 1.0, No. Celtic / CP5-026, XP007915279, (Jan. 16, 2009), 1-110.

Xu, Xiaodong, et al., "Handover Mechanism in Coordinated Multi-Point Transmission/Reception System", ZTE Communications, XP055134194, [Online] retrieved from the internet: <http ://ww-wen.zte.com.cn/endata/magazine/ztecommunications/2010Year/no1/>, (Jan. 1, 2010), 31-35.

(56) References Cited

OTHER PUBLICATIONS

"Taiwanese Application Serial No. 105109504, Office Action dated Mar. 22, 2017", W/ English Translation, 21 pgs.

\* cited by examiner eDAS NETWORK ARCHITECTURE (ANTENNA NODES AND ANTENNA ELEMENTS)

REFERENCE SIGNAL MULTIPLEXING SCHEME

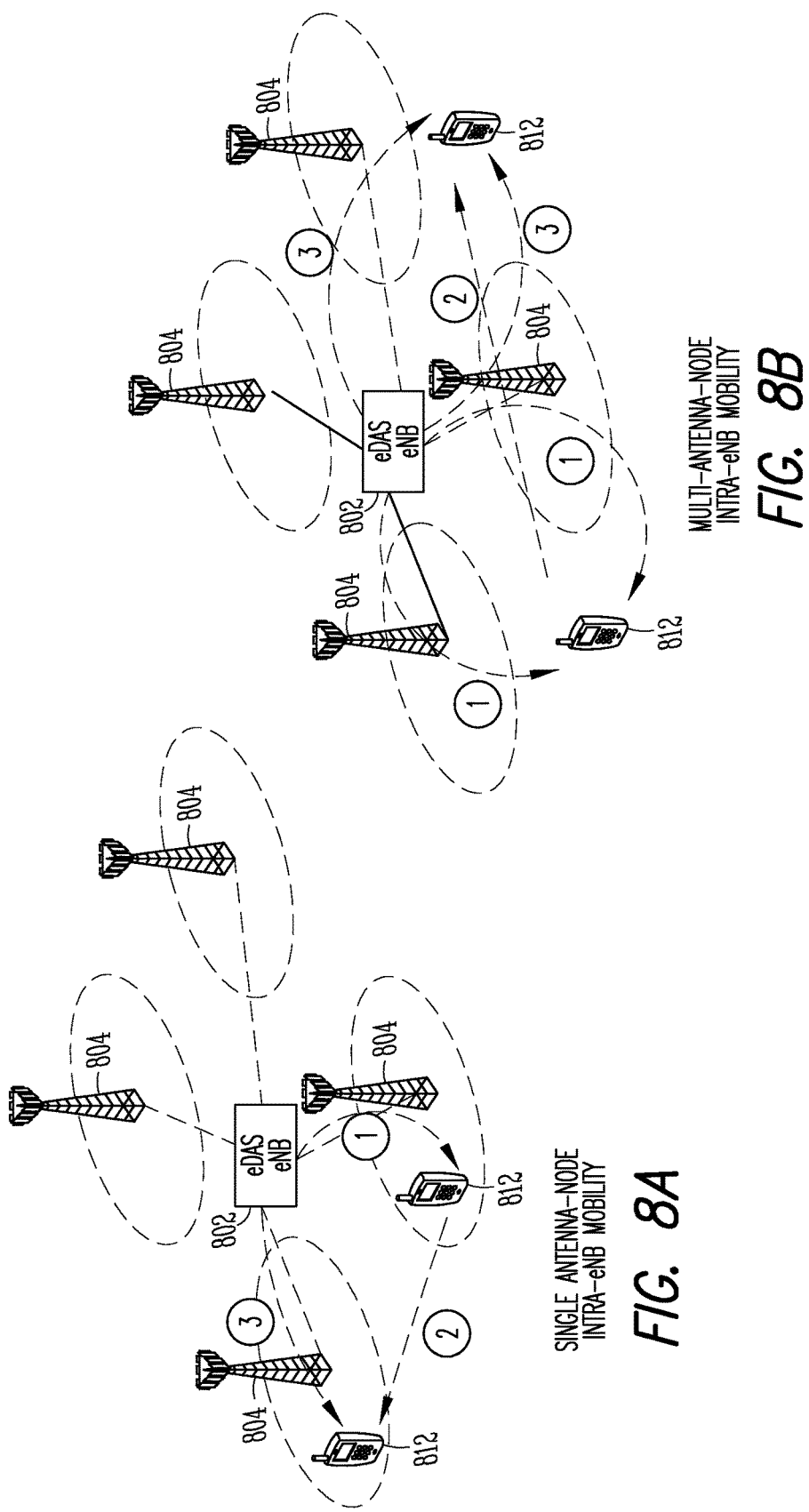

MULTI-ANTENNA-NODE INTER-eNB MOBILITY

USER EQUIPMENT FOR RECEIVING COORDINATED MULTI-POINT (COMP) TRANSMISSIONS

PRIORITY CLAIM

This application is a continuation of U.S. patent application Ser. No. 14/077,556, filed Nov. 12, 2013, which is a continuation of U.S. patent application Ser. No. 12/976,287, filed Dec. 22, 2010, now issued as U.S. Pat. No. 8,599,794, which claims the benefit of priority under 35 U.S.C. §119(e) to U.S. Provisional Patent Application Ser. No. 61/381,005, filed Sep. 8, 2010, entitled ADVANCED WIRELESS COMMUNICATION SYSTEMS AND TECHNIQUES, each of which is incorporated herein by reference in its entirety.

TECHNICAL FIELD

Embodiments pertain to wireless communications. Some embodiments relate to base stations that use distributed antenna systems to communicate with user equipment. Some embodiments relate to networks that operate in accordance with 3GPP LTE Evolved Universal Terrestrial Radio Access Network (E-UTRAN) radio-access technologies (RATs) and evolutions thereof. Some embodiments relate to WiMAX networks that operate in accordance with IEEE 802.16 RATs and evolutions thereof.

BACKGROUND

A conventional distributed-antenna system is a network of spatially separated antennas connected to a common source via a transport medium that provides wireless service within a geographic area (e.g., cell) or a structure (indoor coverage). One issue with the use of a conventional distributed-antenna system in cellular communication systems is that interface between the base station and the antennas is not standardized making it difficult for a conventional distributed-antenna system to fully support and take advantage of the benefits of some advanced communication techniques in current and upcoming wireless standards.

Thus, there are general needs for enhanced distributed-antenna systems and methods for communicating that can more fully support and more fully take advantage of some of the advanced communication techniques in current and upcoming wireless standards.

BRIEF DESCRIPTION OF THE DRAWINGS

FIGS. 8A, 8B and 8C illustrate various antenna node mobility situations in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
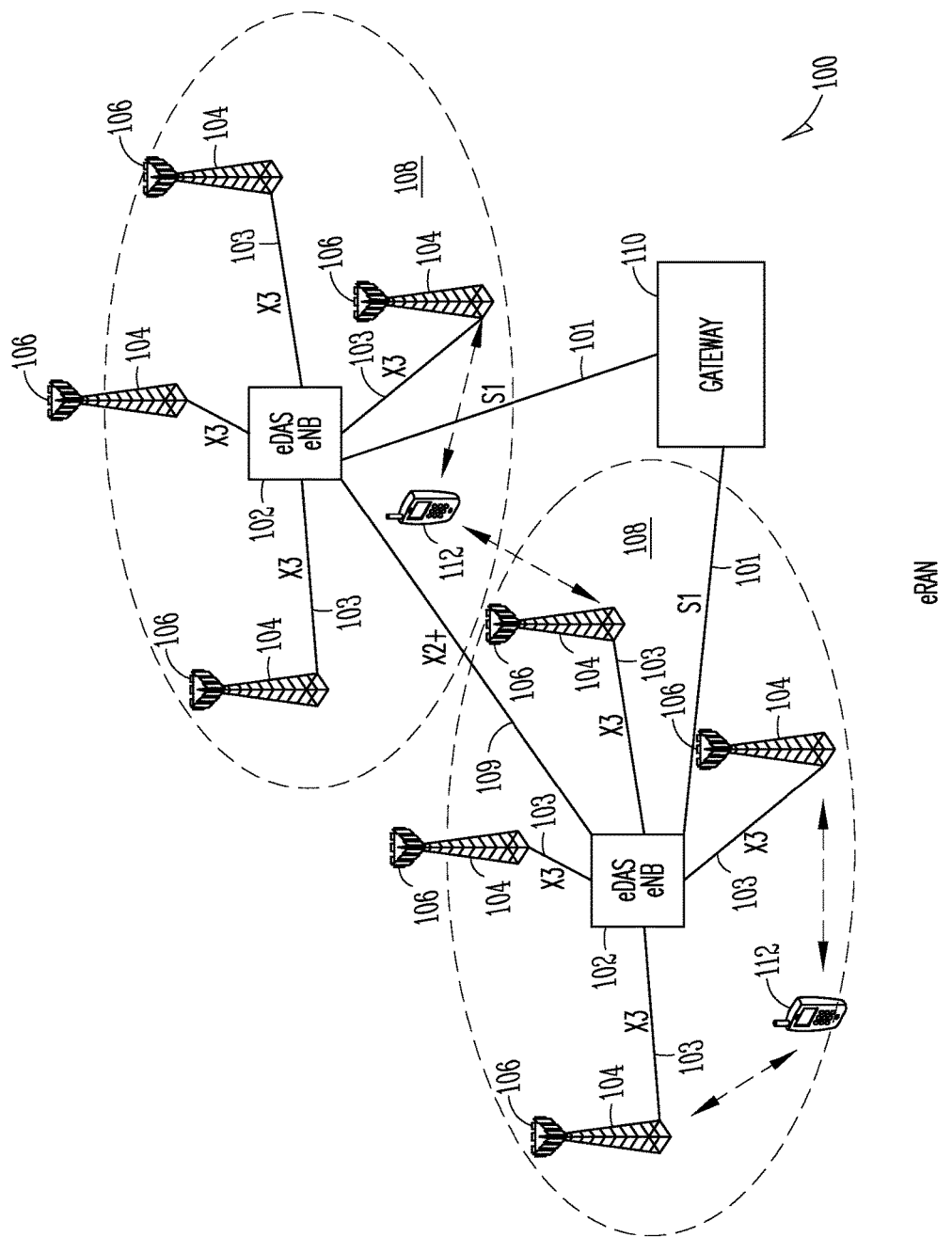
FIG. 1 illustrates an enhanced radio-access network (eRAN) in accordance with some embodiments.

FIG. 1 illustrates an enhanced radio-access network (eRAN) in accordance with some embodiments. The eRAN 100 may include one or more enhanced DAS (eDAS) base stations 102, each configured to serve user equipment (UE) 112 within an associated cell 108. Each eDAS base station (102) may utilize an enhanced distributed antenna system (eDAS) comprising a plurality of geographically-separated antenna nodes 104. Each of the antenna nodes 104 may have a plurality of spatially separated antenna elements 106. At least some of the antenna nodes 104 are not located at the same location as the eDAS base station 102 and are provided at different locations in the cell 108.

In some embodiments, the eRAN 100 may comprise at least two or more eDAS base stations 102 of a paging group that communicate with an access gateway 110. The eDAS base stations 102 of the paging group may be configured to communicate with the access gateway 110 over an S1 interface 101. The eDAS base stations 102 of the paging group may be configured to communicate directly over an X2+ interface 109. Each eDAS base station 102 may operate as a processing center for its associated cell 108 and may be configured to communicate with the antenna nodes 104 over a physical-layer X3 interface 103.

In accordance with embodiments, the eDAS base station 102 may cause the antenna nodes 104 to transmit reference signals in accordance with a multiplexing scheme to allow user equipment 112 to perform channel estimation for the antenna elements 106 of any one or more of the antenna node 104. The eDAS base station 102 may also cause the antenna nodes 104 to transmit synchronization codes to allow user equipment 112 to synchronize with the antenna elements 106 of any one or more of the antenna nodes 104.

Accordingly, the user equipment 112 may uniquely identify the antenna nodes 104 as well as the individual antenna elements 106 of any one of the antenna nodes 104 for both channel estimation and synchronization. As illustrated in FIG. 1, some user equipment 112 may be served by the antenna nodes 104 within the same cell 108, while some user equipment 112 may be served by the antenna nodes 104 from different cells 108. Each cell 108 may be associated with a geographic area.

In accordance with embodiments, the X3 interface 103 between the eDAS base station 102 and the antenna nodes 104 may be standardized allowing the eDAS base station 102 to fully support and take advantage of the benefits of some advanced communication techniques in current and upcoming wireless standards, such as single-user (SU) and multi-user (MU) multiple-input multiple-output (MIMO) (i.e., SU-MIMO and MU-MIMO) communication techniques.

In some embodiments, the eDAS base station 102 may be part of a cooperative RAN architecture that provides enhanced features in order to provide significantly improved coverage, performance, and reliability at significantly reduced complexity and power consumption. In these embodiments, less power may be consumed in overcoming penetration and shadowing losses, since a line-of-sight channel may be present leading to reduced fading depths and reduced delay spread. The transmit power of user equipment 112 may therefore be reduced resulting in more energy-efficient uplink operation and lower battery consumption.

In some embodiments, each antenna element 106 may be a separate antenna and may be effectively separated from other antenna elements 106 of an antenna node 104 to take advantage of spatial diversity and the different channel characteristics that may result between each of the antenna elements 106 and the one or more antennas of the user equipment. In some embodiments, antenna elements 106 may be separated by up to ⅒ of a wavelength or more.

In some embodiments, the eDAS base station 102 may be an eDAS enhanced node B (eNB) configured to operate in accordance with one of the 3GPP LTE E-UTRAN standards (such as LTE release 10). In other embodiments, the eDAS base station 102 may be a WiMAX base station configured to operate in accordance with one of the IEEE 802.16 standards (such as IEEE 802.16m).

Figure 2:
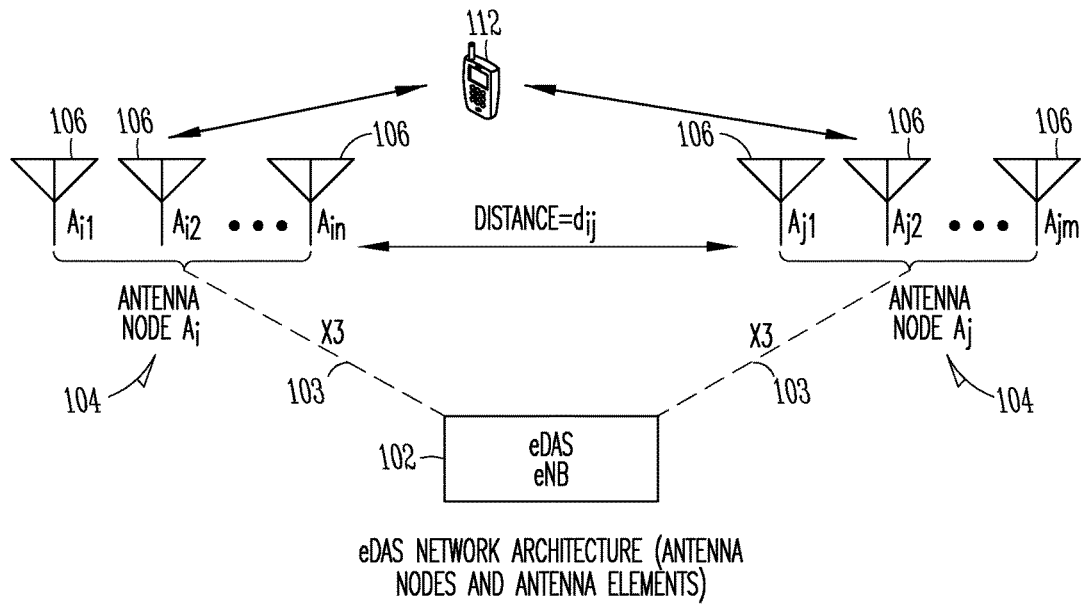
FIG. 2 illustrates an enhanced distributed-antenna system (eDAS) eDAS network architecture in accordance with some embodiments.

FIG. 2 illustrates an enhanced distributed-antenna system (eDAS) eDAS network architecture in accordance with some embodiments. The eDAS base station 102 may communicate with user equipment 112 using two or more antenna nodes 104 (antenna nodes $A_i$ and $A_j$) over the X3 interface 103. As illustrated in FIG. 2, each antenna node 104 may include a plurality of antenna elements 106 (illustrated as $A_{i1}$ through $A_{in}$ for antenna node $A_i$ and illustrated as $A_{j1}$ through $A_{jn}$ for antenna node $A_j$). In accordance with embodiments, each cell 108 (FIG. 1) may include N antenna nodes 104 each having $N_i$ antenna elements 106. Antenna node $A_i$ may be located at distance $d_i$ from the eDAS base station 102 and at distance $d_{ij}$ from antenna node $A_j$. The eDAS base station 102 may have the equivalent of $N \times N_i$ antenna elements where each group of $N_i$ antenna elements are physically separated by a distance that can be geometrically calculated based on $d_i$ and $d_{ij}$.

In these embodiments, multi-stream open-loop and closed-loop SU-MIMO/MU-MIMO schemes may be enabled at each antenna node 104 through the use of $N \times N_i$ common reference signals associated with the $N \times N_i$ logical antenna ports (e.g., one for each antenna element 106. In these embodiments, each antenna node 104 may be uniquely identified via physical layer identifiers as described in more detail below.

Figure 3A:
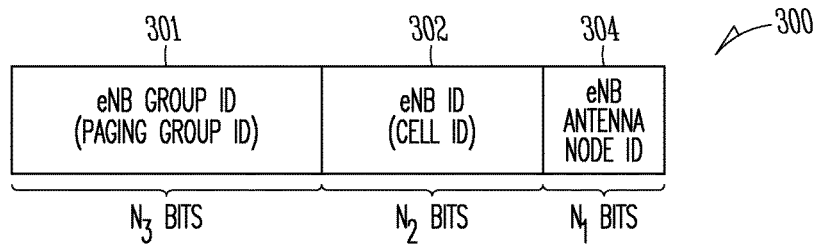
FIG. 3A illustrates the partitioning of synchronization codes in accordance with some embodiments.

FIG. 3A illustrates the partitioning of synchronization codes in accordance with some embodiments. In accordance with embodiments, synchronization codes transmitted by the antenna nodes 104 (FIG. 1) may allow user equipment 112 (FIG. 1) to synchronize with the antenna elements 106 of any one or more of the antenna nodes (104). The synchronization codes may be partitioned to include information fields 300 to uniquely identify a paging group, the eDAS base station 102, and one of the antenna nodes 104. In some embodiments, the information fields 300 of the synchronization codes may include a paging group ID field 301 that identifies the paging group of two or more eDAS base stations 102. The information fields 300 may also include a cell ID field 302 that identifies the eDAS base station 102. The information fields 300 may also include an antenna-node ID field 304 that identifies an individual one of the antenna nodes 104 associated with the eDAS base station 102. In some 3GPP LTE embodiments, the paging group ID field 301 may be an eNB group ID field, the cell ID field 302 may be an eNB ID field, and the antenna-node ID field 304 may be an eNB antenna-node ID field.

In the example illustrated in FIG. 3A, the paging group ID field 301 may comprise N3 bits, the cell ID field 302 may comprise N2 bits, and the antenna-node ID field 304 may comprise $N_1$ bits where $N_1+N_2+N_3=N$ and where N may be a number of antenna nodes 104.

Figure 3B:
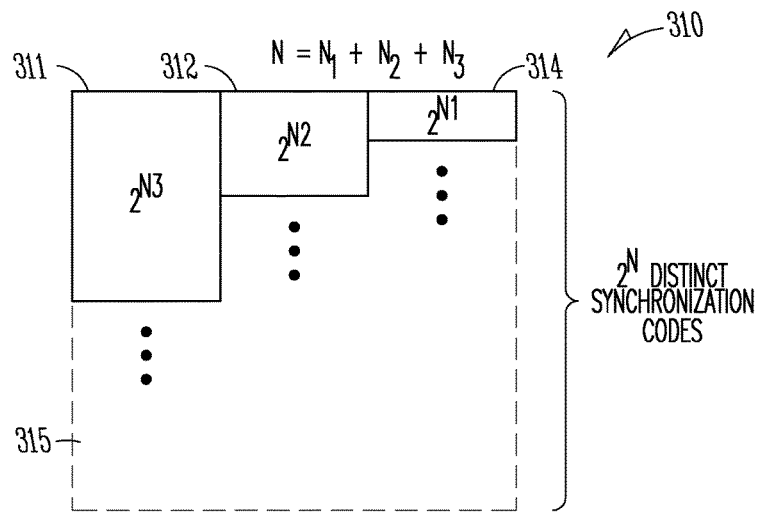
FIG. 3B illustrates a code structure in accordance with some embodiments.

FIG. 3B illustrates a code structure in accordance with some embodiments. The synchronization codes transmitted by the antenna nodes 104 (FIG. 1) may comprise a unique code structure 310 having a code space that is divided into a plurality of subspaces 315. The subspaces 315 may to allow the user equipment 112 (FIG. 1) to uniquely identify the paging group, the eDAS base station 102 (FIG. 1) and the particular antenna node 104 (FIG. 1). In some embodiments, the code structure may comprise a code sequence of $2^N$ distinct synchronization codes.

The plurality of subspaces 315 may include a plurality of paging-group subspaces 311 to identify each paging group of the eRAN 100 (FIG. 1). Each paging-group subspace 311 may be associated with one paging group and includes a plurality of eNB subspaces 312. Each eNB subspace 312 may be associated with one of the eDAS base stations 102 of the paging group and each eNB subspace 312 may have a plurality of antenna-node subspaces 304. Each antenna-node subspace 314 may be associated with one antenna node 104 of the eDAS base station 102.

In some embodiments, the set of distinct synchronization codes 310 may comprise a set or a family of $2^N$ distinct synchronization codes, where N may be the size of the synchronization code sequence. In the example illustrated in FIG. 3B, the code space of $2^N$ codes may be partitioned into $2^N/2^{N3}$ subspaces 311, and each of the subspaces 311 may be further divided into $2^{N3}/2^{N2}$ subspaces 312. Each of subspaces 312 may be further divided into $2^{N2}/2^{N1}$ subspaces 314. This sequence partitioning may help with detecting and decoding of the information fields 300 by the user equipment 112.

The example partitioning and code structure illustrated in FIGS. 3A and 3B allow for an eDAS base station 102 to provide mobility management within a cell 108 by handing over the user equipment 112 from one antenna node 104 or group of antenna nodes 104 to another group. The user equipment 112 can measure and report received signal strength from each antenna node based on the reference signals 601. The eDAS base station 102 may then redirect the signals from another antenna node 104 or group of antenna nodes 104 that are geographically closer to the user equipment 112. Unlike conventional cellular systems, the intra-cell handover and mobility management between antenna nodes 104 may be performed by redirecting the transmissions over the X3 interface 103 from an initial antenna node 104 to target antenna node 104 since the baseband processing is performed within in the eDAS base station 102. Thus the mobility management within an eDAS cell 108 may reduce to "data and control path" selection for the user equipment 112 based on the signal quality measurement reports from the user equipment 112.

Figure 4:
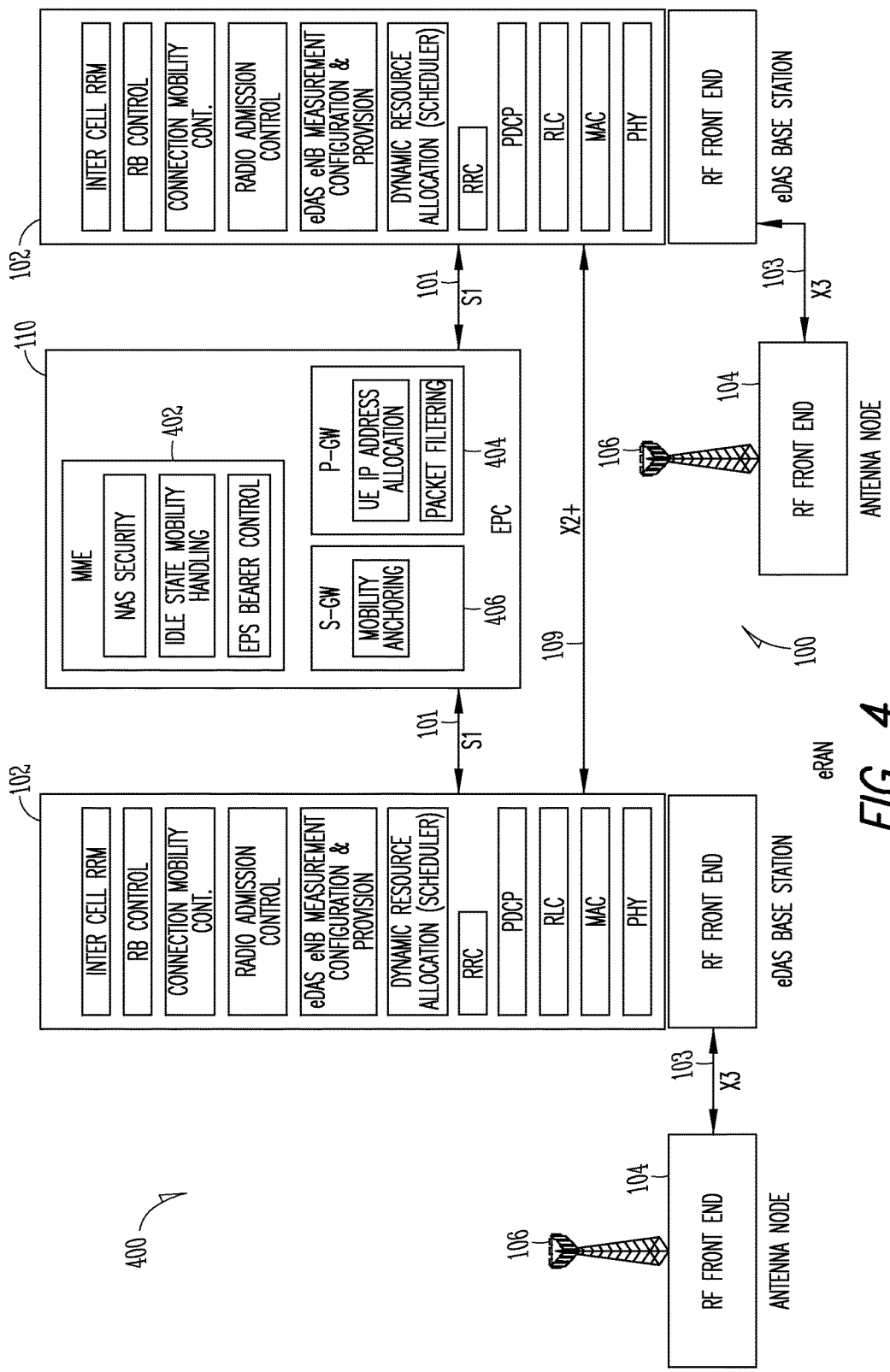
FIG. 4 illustrates various functional elements of the eRAN of FIG. 1 in accordance with some embodiments.

FIG. 4 illustrates various functional elements of the eRAN of FIG. 1 in accordance with some embodiments. The access gateway 110 may include a Mobility Management Entity (MME) 402, a packet data network gateway (P-GW) 404, and a serving gateway (S-GW) 406 for performing conventional gateway functions including providing access to an IP network. In some embodiments, the access gateway 110 may be configured in accordance with the LTE evolved packet core (EPC) specification to provide Multi-megabit bandwidth capability, latency reduction and improved mobility. The eDAS base stations 102 may communicate with the access gateway 110 over a core-network interface (e.g., S1 interface 101).

In some embodiments, the eDAS base station 102 may utilize a software-defined radio (SDR) baseband processing pool comprising a plurality of processors configured to perform the various operations described herein. Each eDAS base station 102 may operate as a processing center for its associated cell 108 and may be configured to communicate with the antenna nodes 104 over the physical-layer X3 interface 103.

The X3 interface 103 may comprise at least one of optical fiber links and coaxial links coupling each antenna node 104 to the baseband processing pool. In some embodiments, the X3 interface 103 may couple RF front ends of each antenna node 104 to an RF front end of the eDAS base station 102. In these embodiments, the X3 interface may be configured to communicate RF signals between the antenna elements 106 of each antenna 104 and the eDAS base station 102. In some alternate embodiments, the X3 interface is configured to communicate baseband signals between the antenna elements 106 of each antenna 104 and the eDAS base station 102. Baseband processing, however, may be performed at the centralized processing location of the eDAS base station 102. The X3 interface may comprise any broad-bandwidth connection that operates at either an RF or baseband level.

In some embodiments, the eDAS base station 102 may configured to perform mobility management between antenna nodes 104 for the user equipment 112, and perform soft and hard handovers between antenna nodes 104 of the same cell 108 for the user equipment 112 using cooperative communications over the X3 interface. In coordinated multipoint (CoMP) embodiments, the eDAS base station 102 may be further configured to perform handovers between antenna nodes 104 of different cells.

Although the eDAS base stations 102, the access gateway 110, and the antenna nodes 104 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the eDAS base stations 102, the access gateway 110, and the antenna nodes 104 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, an eDAS base station 102 may include one or more processors and may be configured with instructions stored on a computer-readable storage device.

Figure 5:
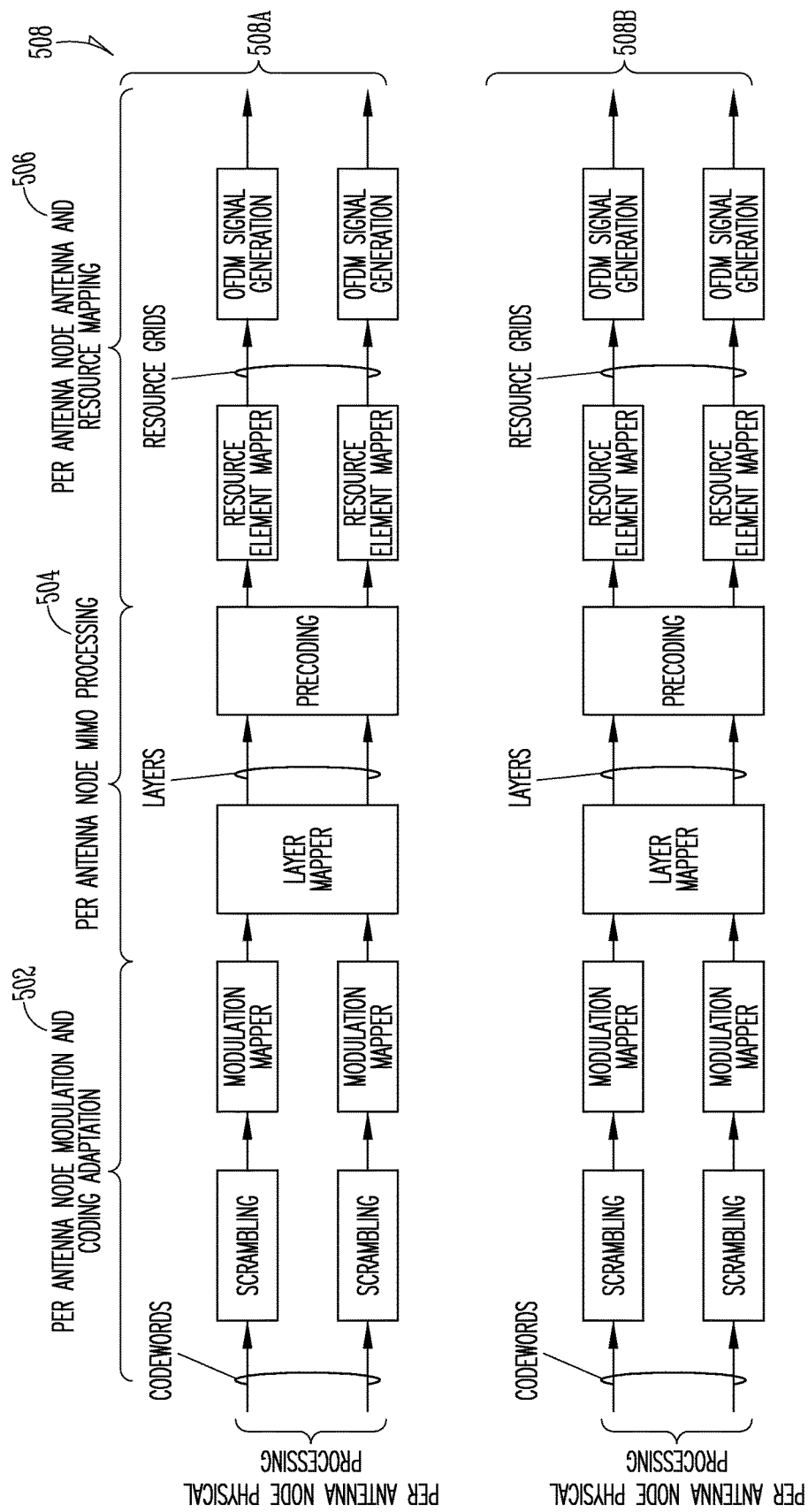
FIG. 5 illustrates downlink physical layer processing performed at an eDAS base station in accordance with some embodiments.

FIG. 5 illustrates downlink physical layer (PHY-layer) processing performed at an eDAS base station in accordance with some embodiments. As discussed above, an eDAS base station 102 (FIG. 1) may operate as a processing center for its associated cell 108 (FIG. 1) and may be configured to communicate with the antenna nodes 104 (FIG. 1) over the X3 interface 103 (FIG. 1).

In accordance with embodiments, each eDAS base station 102 may perform separate physical layer processing for each antenna node 104 and transmit physical-layer signals over the X3 interface 103 to the antenna nodes 104. In the example illustrated in FIG. 5, each eDAS base station 102 may perform per-antenna node modulation and coding adaptation 502. Each eDAS base station 102 may also perform per antenna node MIMO processing 504, and per antenna node antenna and resource mapping 506. These physical-layer processing operations may generate physical-layer signals 508 for transmission over the X3 interface 103 to the antenna nodes 104. In the example illustrated, physical-layer signals 508A may be transmitted to a first antenna node 104 over the X3 interface 103, and physical-layer signals 508B may be transmitted to a second antenna node 104 over the X3 interface 103. Although FIG. 5 illustrates that the physical-layer signals 508 are OFDM signals, this is not a requirement.

In accordance with these embodiments, the baseband processing is performed at the eDAS base station 102 (rather than being performed at the antenna nodes 104). This may allow hardware sharing among the processing blocks used for the antenna nodes 104 served by the same eDAS base station 102. Although FIG. 5 may imply the multiplication of physical processing by the number of the antenna nodes 104 served by the eDAS base station 102, the same transmission chain may actually be shared or reused by reconfiguration of the parameters of the functional blocks. In the example illustrated in FIG. 5, transmission format and modulation and coding schemes may be adapted per antenna node allowing for link-level adaptation of the transmission parameters according to the channel conditions between the user equipment 112 and each antenna node 104. Furthermore, the MIMO modes and encoding schemes as well as layer mapping and resource mapping may be individually adapted per antenna node 104.

The performance of baseband processing for the antenna nodes 104 at the eDAS base station 102 allows the eDAS base station 102 to perform intra-eDAS base station 102 coordinated transmissions from multiple antenna nodes 104 corresponding to the same eDAS base station 102 by jointly adjusting the MIMO encoding parameters for the antenna nodes 104 involved in coordinated transmission.

In some embodiments, the eDAS base station 102 is configured to communicate multi-stream transmissions in accordance with SU-MIMO and MU-MIMO communication techniques. In these embodiments, multi-stream processing as well as SU-MIMO and MU-MIMO processing may be performed at the eDAS base station 102 and the signals may be transmitted over the X3 interface 103 to the selected antenna node 104. In some embodiments, two or more antenna nodes 104 may be used for SU-MIMO and MU-MIMO transmissions. In some embodiments, signal-quality reports, channel state information (CSI) or precoding matrix index (PMI) received from the user equipment 112 may be used by the eDAS base station 102 as part of a closed-loop MIMO communication technique. In some embodiments, open-loop MIMO communication techniques may also be utilized.

Although FIG. 5 illustrates the physical-layer processing performed for the transmitter side, the eDAS base station 102 may also be configured to perform similar per-antenna node physical-layer processing for the receive side. Accordingly, functional receive-side components associated with the antenna nodes 104 of a cell 108 may similarly be shared.

Figure 6:
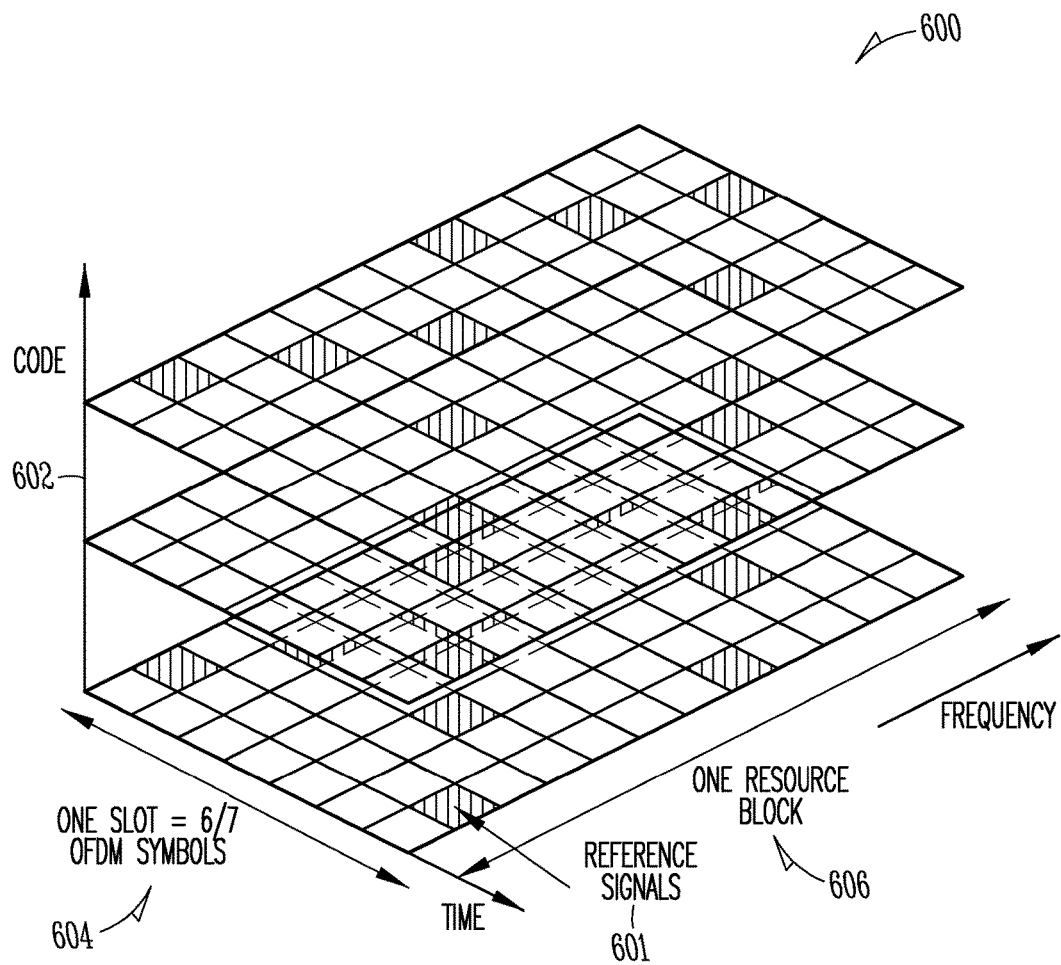
FIG. 6 illustrates reference signal multiplexing scheme in accordance with some embodiments.

FIG. 6 illustrates reference signal multiplexing scheme 600 in accordance with some embodiments. In accordance with embodiments, the DAS base station 102 (FIG. 1) may be configured to cause the antenna nodes 104 (FIG. 1) to transmit reference signals 601 in accordance with a multiplexing scheme 600 to allow user equipment 112 (FIG. 1) to perform channel estimation with the antenna elements 106 (FIG. 1) of any one or more of the antenna node 104.

The multiplexing scheme 600 for the transmission of the reference signals 601 may comprise a combination of code-division multiplexing (CDM), time-division multiplexing (TDM) and frequency-division multiplexing (FDM) (i.e., a CDM/TDM/FDM scheme) to allow the user equipment 112 to uniquely identify reference signals associated with individual antenna elements 106 of any one or more of the antenna nodes 104 for use in channel estimation.

In some embodiments, each of the antenna nodes 104 associated with the eDAS base station 102 may be configured to transmit with a different CDM code 602. The antenna elements 106 of a same antenna node 104 are configured to transmit their reference signals utilizing a common CDM code 602. The antenna elements 106 of the same antenna node 104 may further be configured to transmit the reference signals 601 at different times 604 within an orthogonal-frequency division multiplexed (OFDM) symbol and on different subcarrier frequencies 606 of an OFDM resource block 606 as shown in FIG. 6.

As further illustrated in FIG. 6, since the reference signals 601 transmitted by each antenna node 104 may be transmitted with a different CDM code, each of the antenna nodes 104 may transmit the reference signals 601 at the same times 604 and on the same subcarrier frequencies 606. In these embodiments, the use of reference signals 601 that are code, time, and frequency division multiplexed provides for the unique identification of each of the antenna elements 106 associated with any particular antenna node 104.

Furthermore, in order to perform channel estimation for detection and demodulation purposes, channel state information and channel quality measurements for MIMO mode selection and rank adaptation, the user equipment 112 may be able to estimate the channel to and from each antenna element 106 using these reference signals 601. The reference signals 601 may be common reference signals or may be UE-specific.

In some embodiments, since the number of antenna elements 106 per antenna node 104 as well as the number of antenna nodes 104 of the eDAS base station 102 may be very large (e.g., greater than 1000), the combination of code, time and frequency division multiplexing may help prevent excessive layer-one overhead and may also help prevent the potential loss of code orthogonality during high mobility conditions or due to due to the frequency selectivity of the channel. The use of FDM/TDM reference signals without CDM may result in excessive layer-one overhead and degradation of the overall performance of the system. The use of CDM reference signals without FDM or TDM may result in a potential loss of code orthogonality during high mobility conditions or due to due to frequency selectivity of the channel.

As illustrated in FIG. 6, by assigning each CDM/FDM/TDM code to one antenna element, antenna elements 106 of an antenna node 104 may be identified by the unique reference signals 601 that are transmitted from that antenna element. The reference signals 601 may be time-division and/or frequency-division multiplexed with data sub-carriers within the resource block 606. In some embodiments, the reference signals 601 may be time-division and/or frequency-division multiplexed with data sub-carriers within the resource block 606 over either a sub-band or the entire frequency band depending on whether the reference signal is UE-specific or a common reference signal (i.e., a common narrowband reference signal or a common wideband reference signal).

Accordingly, since the user equipment 112 can distinguish between the reference signals transmitted from each antenna element 106 as well as from each antenna node 104, the user equipment 112 may be able to perform MIMO channel estimation for improved SU-MIMO or MU-MIMO communications, among other things.

In accordance with some embodiments, the eDAS base station 102 may receive signal-quality reports from the user equipment 112 that uniquely identify one of the antennas nodes 104 and include signal-quality information of signals received by the user equipment 112 from the antenna node 104. The user equipment 112 may transmit a signal-quality report to the eDAS base station 102 for each antenna node 104 that it receives signals from for use by the eDAS base station 102. The eDAS base station 102 may accordingly direct signals to the appropriate antenna node 104 over the X3 interface 103. In these embodiments, the user equipment 112 may be able to perform channel estimation for one or more of the antenna elements 106 of an antenna node 104 based on the reference signals 601 transmitted in accordance with the multiplexing scheme 600.

The signal-quality reports may be based on the channel estimation. In some embodiments, the signal-quality reports may include an indication of at least one of received signal strength indicator (RSSI), a reference signal received power (RSRP) in some 3GPP LTE embodiments, a carrier to interference-plus-noise ratio (CINR), or other signal quality parameter or path-loss measurement associated with the reference signals received from an indicated antenna node 104. In some embodiments, the user equipment 112 may be configured to select an antenna node 104 among two or more of the antenna nodes 104 based on the signal-quality information of the reference signals transmitted by the antenna nodes 104.

Accordingly, since the user equipment 112 is configured to uniquely identify an antenna node 104, the eDAS base station 102 may communicate with user equipment 112 using one or more antenna nodes 104 that may be closest to the user equipment 112 (e.g., have the best signal characteristics) allowing the user equipment 112 to communicate with reduced transmission power levels which may reduce the power consumption of the user equipment 112. Furthermore, signal quality and throughput may be improved.

In some embodiments, the signal-quality reports transmitted by the user equipment 112 may identify the paging group ID, the cell ID, as well as the antenna node ID identifying the particular antenna node 104 from which reference signals were received. In these embodiments, the signal-quality reports may provide signal-quality information associated with signals received by user equipment 112 from a particular antenna node 104. Accordingly, each signal-quality report may be associated with a particular antenna node 104.

Figure 7:
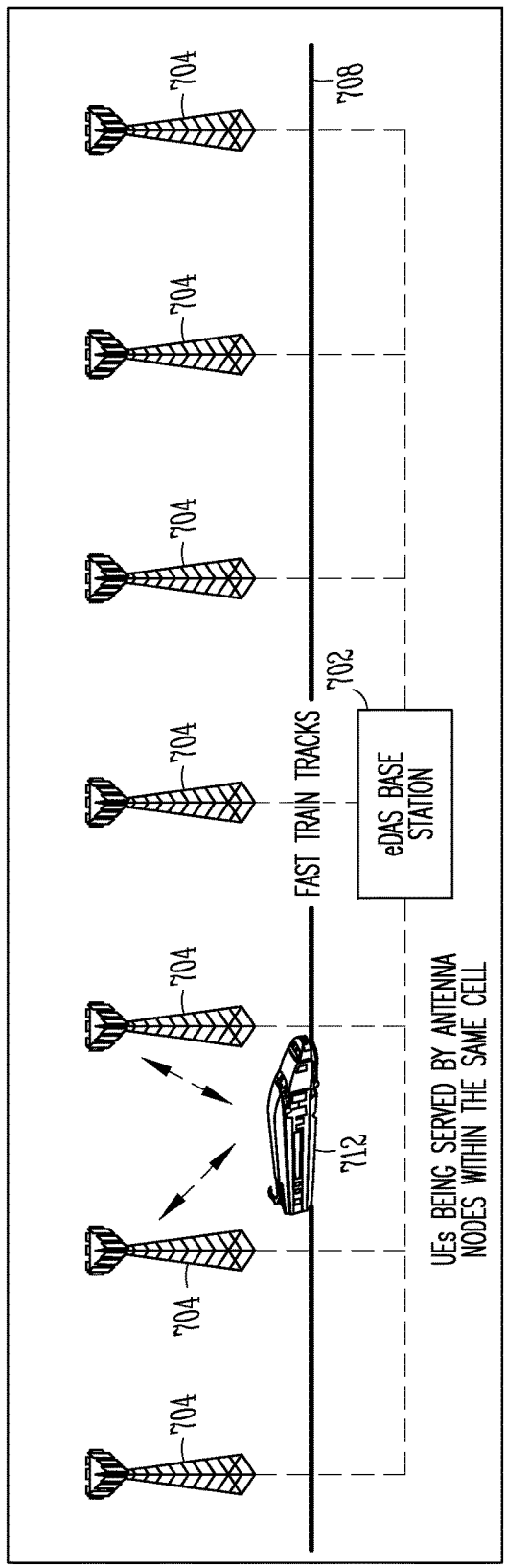
FIG. 7 is an example of an eDAS base station configured for operation along train tracks in accordance with some embodiments.

FIG. 7 is an example of an eDAS base station configured for operation along train tracks in accordance with some embodiments. The eDAS base station 702 may communicate with antenna nodes 704 over an X3 interface to provide communication services within a cell. Antenna nodes 704 may be positioned along train tracks 708. In accordance with embodiments, the antenna nodes 704 may be spatially separated and provided at different geographic locations with the cell (i.e., along the train tracks 708). The eDAS base station 702 may be configured to perform physical-layer baseband processing for each of the antenna nodes 704 at a centralized processing location. The eDAS base station 702 may also be configured to perform an intra-cell handover between the antenna nodes 704 by redirecting physical-layer signals over the X3 interface from one antenna node 104 to a next antenna node 104, for example, as a train moves along the tracks 708. The eDAS base station 702 may be configured to be similar to eDAS base stations 102 (FIG. 1).

Figure 8C:
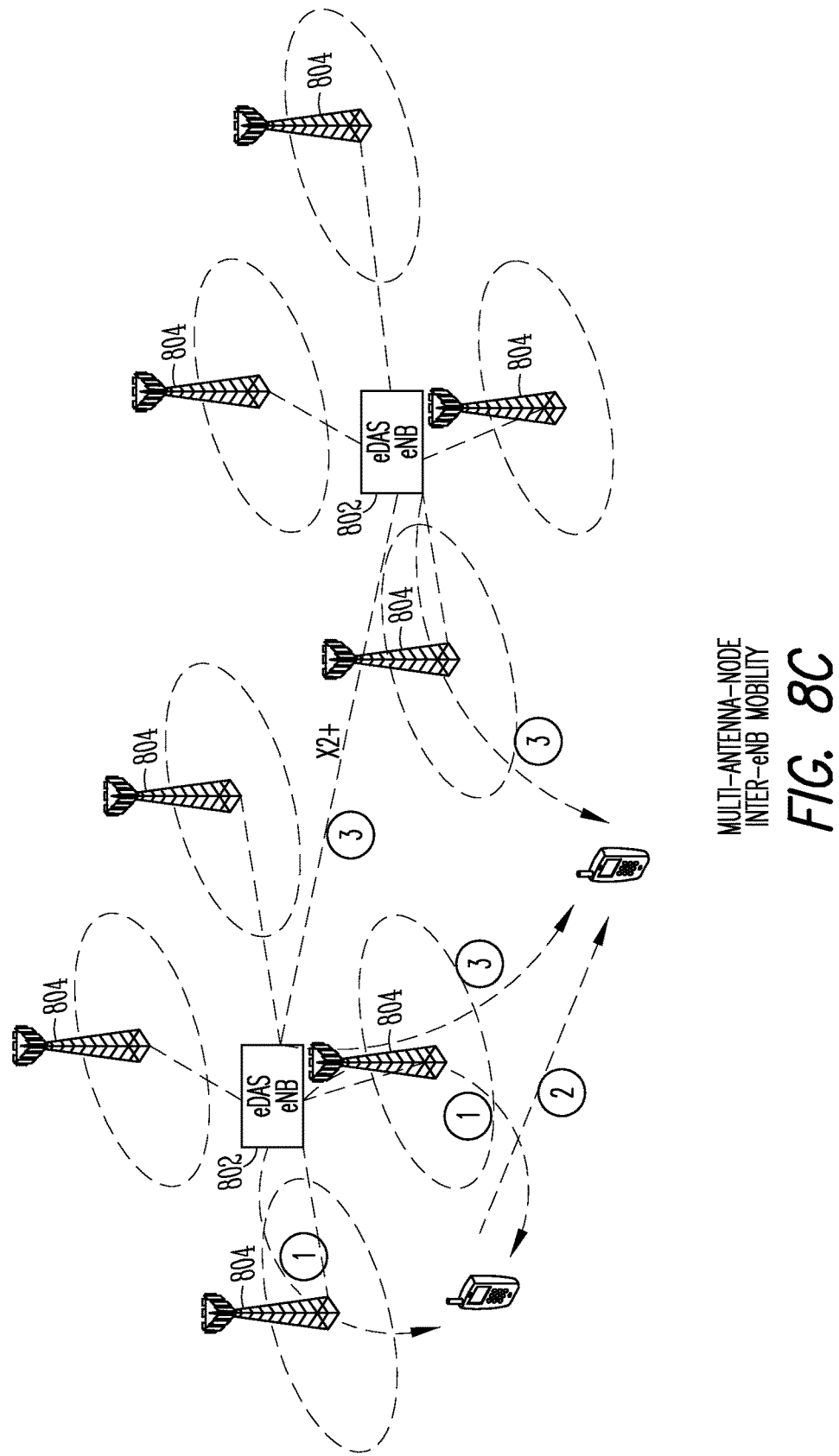

FIGS. 8A, 8B and 8C illustrate various antenna node mobility situations in accordance with some embodiments. In FIG. 8A, single antenna node intra-eNB mobility is illustrated. In FIG. 8B, multi-antenna node intra-eNB mobility is illustrated. As illustrated, geographically-separated antenna nodes 804 are provided at different geographic locations served by the eDAS eNB 802. In these embodiments, wherein the eDAS eNB 802 is configured to perform physical-layer baseband processing for each of the antenna nodes 804 at a centralized processing location, and perform an intra-cell handovers between the antenna nodes 804 by redirecting physical-layer signals over the X3 interface from an initial antenna node 804 to a target antenna node 804.

In FIG. 8C, multi-antenna node inter-eNB mobility is illustrated. In these embodiments, an inter-eNB handover is performed between two eDAS eNBs 802 of a RAN. In these embodiments, the handover may be coordinated directly between the two DAS eNBs 802 over an X2+ interface, such as the X2+ interface 109 (FIG. 4)

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of user equipment (UE) comprising; transceiver circuitry; and processing circuitry in communication with the transceiver circuitry and configured to: cause the transceiver circuitry to receive first reference signals from a first transmission point associated with an enhanced Node B (eNB) of a serving cell;
cause the transceiver circuitry to receive second reference signals from a second transmission point, the second transmission point located separately from the first transmission point, at least one of the first or second reference signals being UE-specific reference signals;
cause the transceiver circuitry to report first channel estimation information based on receipt of the first reference signals to the eNB;
cause the transceiver circuitry to report second channel estimation information based on receipt of the second reference signals to the eNB; and
decode coordinated multipoint (CoMP) transmissions from the first and second transmission points based at least in part on the reported first and second channel estimation information;
wherein at least one of the first or second reference signals comprises a synchronization code that comprises information fields, and the information fields comprise: a paging group identification (ID) field that identifies a paging group that comprises multiple eNBs that include the eNB;
a cell ID field that identifies the eNB; and
a transmission point ID field that identifies the first transmission point for the first reference signal or the second transmission point for the second reference signal, and
wherein the UE-specific reference signals are transmitted in accordance with a multiplexing scheme comprising at least one of code-division multiplexing (CDM), time-division multiplexing (TDM) and frequency-division multiplexing (FDM).

2. The apparatus of claim 1 wherein the first and second channel estimation information comprises a channel quality indicator (CQI), and wherein the apparatus is further configured to report a precoding matrix indicator (PMI).

3. The apparatus of claim 1 wherein the multiplexing technique is configured to uniquely identify the first and second reference signals in order to associate the first and second reference signals with the first and second transmission points.

4. The apparatus of claim 1 wherein the second transmission point is associated with a non-serving cell for the UE.

5. The apparatus of claim 4 wherein the non-serving cell lies at least partially within a geographic region of the serving cell.

6. The apparatus of claim 1 wherein the first transmission point is associated with one or more first antenna nodes, and wherein the second transmission point is associated with one or more second antenna nodes.

7. The apparatus of claim 6 wherein the first and second antenna nodes are part of a distributed antenna system.

8. The apparatus of claim 1 wherein the first and second channel estimation information uniquely identifies the first and second transmission point, respectfully.

9. The apparatus of claim 1 wherein the first and second transmission points comprise quasi co-located antenna ports.

10. The apparatus of claim 1 wherein the multiplexing scheme uniquely identifies which of the first and second reference signals particular reference signals are, and the multiplexing scheme for each of the first and second reference signals comprises a unique combination of CDM, TDM and FDM.

11. The apparatus of claim 10 wherein a CDM code of the first and second reference signals is a common CDM code.

12. The apparatus of claim 10 wherein CDM codes of the first and second reference signals are different.

13. A non-transitory computer-readable storage medium that stores instructions for execution by one or more processors of user equipment (UE) to cause the UE to:
decode first reference signals received from a first transmission point associated with an enhanced Node B (eNB) of a serving cell;
decode second reference signals received from a second transmission point, the second transmission point located separately from the first transmission point, at least one of the first or second reference signals being UE-specific reference signals;

report first channel estimation information based on receipt of the first reference signals to the eNB; report second channel estimation information based on receipt of the second reference signals to the eNB; and decode coordinated multipoint (CoMP) transmissions from the first and second transmission points based at least in part on the reported first and second channel estimation information;

wherein at least one of the first or second reference signals comprises a synchronization code that comprises information fields, and the information fields comprise:

a paging group identification (ID) field that identifies a paging group that comprises multiple eNBs that include the eNB;

a cell ID field that identifies the eNB; and a transmission point ID field that identifies the first transmission point for the first reference signal or the second transmission point for the second reference signal, and wherein the UE-specific reference signals are transmitted in accordance with a multiplexing scheme comprising at least one of code-division multiplexing (CDM), time-division multiplexing (TDM) and frequency-division multiplexing (FDM).

14. The computer-readable storage medium of claim 13 wherein the first and second channel estimation information comprises a channel quality indicator (CQI), and wherein the UE is further configured to report a precoding matrix indicator (PMI).

15. The computer-readable storage medium of claim 13 wherein the second transmission point is associated with a non-serving cell for the UE.

16. The computer-readable storage medium of claim 15 wherein the non-serving cell lies at least partially within a geographic region of the serving cell.

17. The computer-readable storage medium of claim 13 wherein the first transmission point is associated with one or more first antenna nodes, and wherein the second transmission point is associated with one or more second antenna nodes.

18. The computer-readable storage medium of claim 17 wherein the first and second antenna nodes are part of a distributed antenna system.

19. An apparatus of an enhanced node B (eNB) comprising: transceiver circuitry; and processing circuitry in communication with the transceiver circuitry and configured to:

configure first reference signals for transmission by a first transmission point, the eNB providing a serving cell for a user equipment (UE);

configure second reference signals for transmission by a second transmission point, the first and second reference signals being synchronized and configured in accordance with a multiplexing scheme, at least one of the first or second reference signals being UE-specific reference signals;

cause the transceiver circuitry to receive a report of first channel estimation information from the UE based on the first reference signals;

cause the transceiver circuitry to receive a report of second channel estimation information from the UE based on the second reference signals; and configure the first and second transmission points for coordinated multipoint (CoMP) transmissions to the UE based at least in part on the reported first and second channel estimation information;

wherein at least one of the first or second reference signals comprises a synchronization code that comprises information fields, and the information fields comprise:

a paging group identification (ID) field that identifies a paging group that comprises multiple eNBs that include the eNB;

a cell ID field that identifies the eNB; and a transmission point ID field that identifies the first transmission point for the first reference signal or the second transmission point for the second reference signal, and wherein the UE-specific reference signals are transmitted in accordance with a multiplexing scheme comprising at least one of code-division multiplexing (CDM), time-division multiplexing (TDM) and frequency-division multiplexing (FDM).

20. The apparatus of claim 19 wherein the first and second transmission points are not co-located.

21. The apparatus of claim 19 wherein the CoMP transmissions comprise synchronized joint-transmissions from the first and second transmission points.

22. The apparatus of claim 21 wherein the first and second channel estimation information comprises a channel quality indicator (CQI), and wherein the apparatus is further configured to receive a precoding matrix indicator (PMI) from the UE for each report.

23. The apparatus of claim 19 wherein the first transmission point is associated with the serving cell for the UE, and the second transmission point is associated with a non-serving cell for the UE.

24. The apparatus of claim 23 wherein the non-serving cell lies at least partially within a geographic region of the serving cell.

25. The apparatus of claim 19 wherein the first transmission point is associated with one or more first antenna nodes, and wherein the second transmission point is associated with one or more second antenna nodes.

26. The apparatus of claim 24 wherein the first and second antenna nodes are part of a distributed antenna system.

* * * * *

UNITED STATES PATENT AND TRADEMARK OFFICE
CERTIFICATE OF CORRECTION

PATENT NO. : 9,788,313 B2  
APPLICATION NO. : 14/881450  
DATED : October 10, 2017  
INVENTOR(S) : Sassan Ahmadi Page 1 of 1

It is certified that error appears in the above-identified patent and that said Letters Patent is hereby corrected as shown below:

In the Claims

In Column 9, Line 51, in Claim 1, delete "comprising;" and insert --comprising:-- therefor In Column 9, Line 52, in Claim 1, after "and", insert --¶--

In Column 9, Line 53, in Claim 1, after "to:", insert --¶--

In Column 10, Line 7, in Claim 1, after "comprise:", insert --¶--

In Column 11, Line 44-45, in Claim 19, after "comprising:", insert --¶--

In Column 11, Line 45, in Claim 19, after "and", insert --¶--

Signed and Sealed this  
Twenty-eighth Day of May, 2019

Andrei Iancu  
*Director of the United States Patent and Trademark Office*